United States Patent
Yoshinaga

(10) Patent No.: US 11,341,774 B2
(45) Date of Patent: May 24, 2022

(54) INFORMATION PROCESSING APPARATUS, DATA GENERATION METHOD, AND NON-TRANSITORY COMPUTER READABLE MEDIUM STORING PROGRAM

(71) Applicant: NEC CORPORATION, Tokyo (JP)

(72) Inventor: Naoki Yoshinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/041,560

(22) PCT Filed: Oct. 29, 2018

(86) PCT No.: PCT/JP2018/040097
§ 371 (c)(1),
(2) Date: Sep. 25, 2020

(87) PCT Pub. No.: WO2019/187288
PCT Pub. Date: Oct. 3, 2019

(65) Prior Publication Data
US 2021/0133435 A1 May 6, 2021

(30) Foreign Application Priority Data

Mar. 27, 2018 (JP) .............................. JP2018-060873

(51) Int. Cl.
*G06V 40/20* (2022.01)
*G06T 7/292* (2017.01)
(Continued)

(52) U.S. Cl.
CPC .............. *G06V 40/20* (2022.01); *G06T 7/248* (2017.01); *G06T 7/292* (2017.01); *G06V 20/40* (2022.01);
(Continued)

(58) Field of Classification Search
CPC ........... G06K 9/00335; G06K 9/00778; G06K 9/00711; G06T 7/292; G06T 7/248;
(Continued)

(56) References Cited

FOREIGN PATENT DOCUMENTS

| JP | 2006-092396 A | 4/2006 | |
|----|---------------|--------|--|
| JP | 2006092396 | * 6/2006 | ......... G06K 9/00771 |

(Continued)

OTHER PUBLICATIONS

International Search Report of PCT/JP2018/040097 dated Dec. 11, 2018 [PCT/ISA/210].

*Primary Examiner* — Myron Wyche
(74) *Attorney, Agent, or Firm* — Sughrue Mion, PLLC

(57) ABSTRACT

An information processing apparatus, a data generation method, and a program capable of obtaining useful information about a person from video data are provided. An information processing apparatus (1) according to an example embodiment includes a base-information acquisition unit (2) that acquires a plurality of types of pieces of base information based on video data in which at least one person is shown, the pieces of base information being pieces of information used to monitor a person, and a base-information integration unit (3) that generates integrated information by integrating, among the plurality of pieces of base information, those that satisfy a predetermined relation as information of one and the same person.

13 Claims, 10 Drawing Sheets

(51) Int. Cl.
*G06T 7/246* (2017.01)
*G06V 20/40* (2022.01)
*G06V 20/52* (2022.01)

(52) U.S. Cl.
CPC .... *G06V 20/53* (2022.01); *G06T 2207/10016* (2013.01); *G06T 2207/30201* (2013.01); *G06T 2207/30232* (2013.01)

(58) Field of Classification Search
CPC . G06T 2207/10016; G06T 2207/30201; G06T 2207/30232
See application file for complete search history.

(56) References Cited

FOREIGN PATENT DOCUMENTS

| | | |
|---|---|---|
| WO | 2008/111459 A1 | 9/2008 |
| WO | 2016/013298 A1 | 1/2016 |
| WO | 2017/126187 A1 | 7/2017 |

\* cited by examiner

Fig. 3

| ID | $t_1$ | $t_2$ | $t_3$ | ... | $t_n$ | ... |
|---|---|---|---|---|---|---|
| $A_{i\_1}$ | $(x_{11}, y_{11})$ | $(x_{12}, y_{12})$ | $(x_{13}, y_{13})$ | ... | $(x_{1n}, y_{1n})$ | ... |
| $A_{i\_2}$ | $(x_{21}, y_{21})$ | $(x_{22}, y_{22})$ | $(x_{23}, y_{23})$ | ... | $(x_{2n}, y_{2n})$ | ... |
| $A_{i\_3}$ | $(x_{31}, y_{31})$ | $(x_{32}, y_{32})$ | $(x_{33}, y_{33})$ | ... | $(x_{3n}, y_{3n})$ | ... |
| .. | .. | .. | .. | .. | .. | .. |

TIME

Fig. 4

| ID | AREA OF FLOW OF PEOPLE | OCCURRENCE TIME PERIOD | VELOCITY |
|---|---|---|---|
| $B_{i\_1}$ | $a_1$ | $T_1$ | $v_1$ |
| $B_{i\_2}$ | $a_2$ | $T_2$ | $v_2$ |
| : | : | : | : |

Fig. 5

| ID | POSITION | FEATURE VALUE | TIME |
|---|---|---|---|
| $C_{i\_1}$ | $(x_{11}, y_{11})$ | $f_1$ | $t_1$ |
| $C_{i\_2}$ | $(x_{21}, y_{21})$ | $f_2$ | $t_2$ |
| $C_{i\_3}$ | $(x_{31}, y_{31})$ | $f_3$ | $t_3$ |
| $C_{i\_4}$ | $(x_{41}, y_{41})$ | $f_4$ | $t_4$ |
| $C_{i\_5}$ | $(x_{51}, y_{51})$ | $f_5$ | $t_5$ |
| ⋮ | ⋮ | ⋮ | ⋮ |

Fig. 6

| ID | COMBINATION OF BASE INFORMATION |
|---|---|
| $X_1$ | ( $A_{1\_1}$, $B_{3\_2}$, $C_{3\_1}$ ) |
| $X_2$ | ( $A_{2\_1}$, $B_{1\_3}$ ) |
| $X_3$ | ( $B_{2\_4}$, $C_{1\_5}$ ) |
| $X_4$ | ( $A_{3\_2}$, $C_{2\_4}$ ) |
| $X_5$ | ( $A_{4\_1}$, $A_{5\_2}$, $B_{4\_2}$, $B_{5\_4}$, $C_{2\_3}$, $C_{2\_6}$ ) |
| ⋮ | ⋮ |

INFORMATION PROCESSING APPARATUS, DATA GENERATION METHOD, AND NON-TRANSITORY COMPUTER READABLE MEDIUM STORING PROGRAM

CROSS REFERENCE TO RELATED APPLICATIONS

This application is a National Stage of International Application No. PCT/JP2018/040097, filed Oct. 29, 2018, claiming priority to Japanese Patent Application No. 2018-060873, filed Mar. 27, 2018, the contents of all of which are incorporated herein by reference in their entirety.

TECHNICAL FIELD

The present invention relates to an information processing apparatus, a data generation method, and a program.

BACKGROUND ART

In recent years, the risk of dangerous acts such as terrorism occurring in places where a large number of people gather, such as places where events are held, has been increasing. Because of such circumstances, it has been desired to develop a monitoring technique using a video image taken by a camera. For example, Patent Literature 1 discloses a suspicious behavior detection system that detects suspicious behavior of a person to be monitored by using a video image taken by a camera. This system acquires information about a moving trajectory of a person to be monitored, identifies a behavioral state of the person to be monitored based on the information about the moving trajectory, and then automatically determines whether the behavior of the person to be monitored is suspicious or not. Further, as another known related technique, there is a technique for detecting information about the face of a person shown in a video image taken by a camera.

CITATION LIST

Patent Literature

Patent Literature 1: International Patent Publication No. WO2008/111459

SUMMARY OF INVENTION

Technical Problem

As described above, it is technically possible to acquire various types of information such as information about a trajectory of a movement of a person and his/her facial information from a video image taken by a camera. However, there are cases in which it is difficult to obtain useful information from only one of these types of information. Therefore, it has been desired to make more useful use of these types of information which are independently obtained.

Therefore, one of the objects that an example embodiment disclosed in this specification is intended to achieve is to provide an information processing apparatus, a data generation method, and a program capable of obtaining useful information about a person from video data.

Solution to Problem

An information processing apparatus according to a first aspect include: base-information acquisition means for acquiring a plurality of types of pieces of base information based on video data in which at least one person is shown, the pieces of base information being pieces of information used to monitor a person; and base-information integration means for generating integrated information by integrating, among the plurality of pieces of base information, those that satisfy a predetermined relation as information of one and the same person.

A data generation method according to a second aspect includes: acquiring a plurality of types of pieces of base information based on a video image in which at least one person is shown, the pieces of base information being pieces of information used to monitor a person; and generating integrated information by integrating, among the plurality of pieces of base information, those that satisfy a predetermined relation as information of one and the same person.

A program according to a third aspect causes a computer to perform: a base-information acquisition step of acquiring a plurality of types of pieces of base information based on video data in which at least one person is shown, the pieces of base information being pieces of information used to monitor a person; and a base-information integration step of generating integrated information by integrating, among the plurality of pieces of base information, those that satisfy a predetermined relation as information of one and the same person.

Advantageous Effects of Invention

According to the above-described aspect, it is possible to provide an information processing apparatus, a data generation method, and a program capable of obtaining useful information about a person from video data.

BRIEF DESCRIPTION OF DRAWINGS

FIG. 3 is a schematic diagram showing an example of a table of a moving-path data stored in a base-information storage unit;

FIG. 4 is a schematic diagram showing an example of a table of human-flow data stored in the base-information storage unit;

FIG. 5 is a schematic diagram showing an example of a table of facial data stored in the base-information storage unit;

FIG. 6 is a schematic diagram showing an example of a table of integrated information stored in an integrated information sample storage unit;

DESCRIPTION OF EMBODIMENTS

Overview of Example Embodiment

Figure 1:
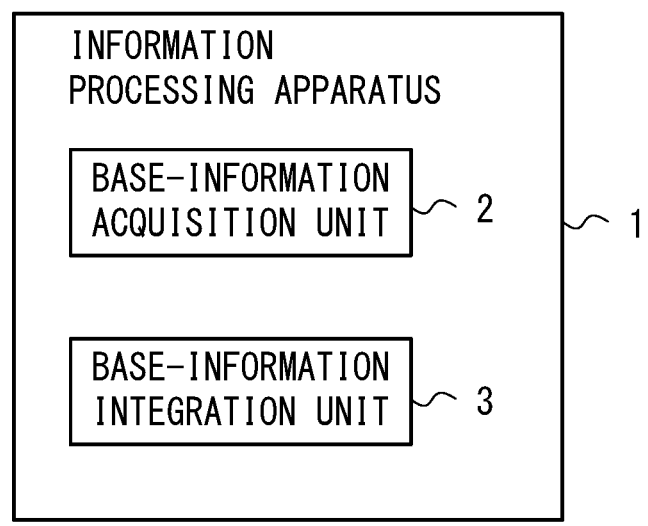
FIG. 1 is a block diagram showing an example of a configuration of an information processing apparatus according to an outline of an example embodiment.

Prior to describing an example embodiment in detail, an outline of the example embodiment will be described. FIG. 1 is a block diagram showing an example of a configuration of an information processing apparatus 1 according to the outline of an example embodiment. As shown in FIG. 1, the information processing apparatus 1 includes a base-information acquisition unit 2 and a base-information integration unit 3.

The base-information acquisition unit 2 acquires a plurality of types of pieces of base information based on video data in which at least one person is shown. Note that the base information is information that is used to monitor a person, and may be, for example, information about an external feature of a person or information about the position of a moving person. The external feature of the person is, for example, a feature of the face of the person. In this case, the information about the external feature of the person is information about a photographed (or filmed) face (an image feature value of the face) of the person. Note that the external feature may be any external feature that can be acquired from a video image and is not limited to those of a face. For example, the external feature may be a feature of a physique. The information about the position of the moving person may be, for example, moving-path data, i.e., data indicating a moving path of one and the same person, or human-flow data, i.e., data indicating a flow of people formed by movements of a plurality of persons, or both of them.

The base-information integration unit 3 generates integrated information by integrating, among all the pieces of base information, those satisfying a predetermined relation as information of one and the same person. In particular, the base-information integration unit 3 generates integrated information by integrating a plurality of types of pieces of base information. For example, the base-information integration unit 3 integrates information about the face of a given person with moving-path data of that person. Further, for example, the base-information integration unit 3 integrates information about the face of a given person with human-flow data indicating a flow of people including that person. Further, for example, the base-information integration unit 3 integrates moving-path data of a given person with human-flow data indicating a flow of people including that person. The only requirement for the base-information integration unit 3 is that it should integrate at least two pieces of base information as one related data group. That is, the base-information integration unit 3 may integrate any number of pieces of base information with each other. Note that the base-information integration unit 3 may further integrate pieces of base information of the same type. For example, the base-information integration unit 3 may integrate two different pieces of information about the face of a given person with moving-path data of that person.

In the information processing apparatus 1, as described above, the base-information integration unit 3 integrates different types of pieces of base information for one and the same person. Therefore, according to the information processing apparatus 1, it is possible to associate different types of different pieces of base information with each other as base information for one and the same person. Therefore, it is possible to analyze one and the same person from multiple points of view. That is, according to the information processing apparatus 1, it is possible to obtain useful information about a person from video data.

Details of Example Embodiment

Figure 2:
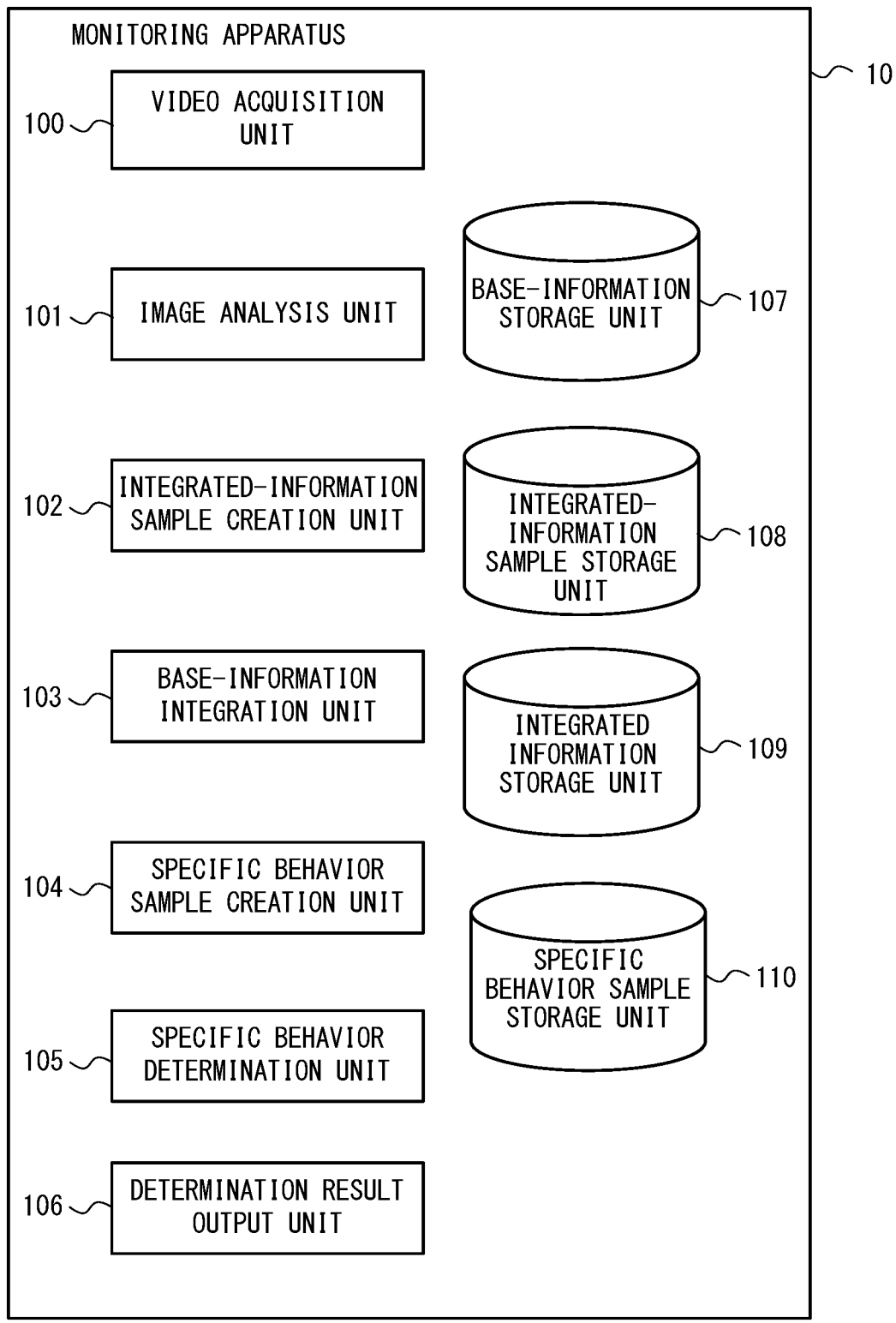
FIG. 2 is a block diagram showing an example of a configuration of a monitoring apparatus according to an example embodiment.

Next, details of an example embodiment will be described. FIG. 2 is a block diagram showing an example of a configuration of a monitoring apparatus 10 according to an example embodiment. The monitoring apparatus 10 corresponds to the information processing apparatus 1 shown in FIG. 1. The monitoring apparatus 10 is connected to at least one camera (not shown) through a wired or wireless network so that it can communicate with the camera, and can receive video data transmitted from the camera. Note that these cameras are, for example, arranged in a scattered manner within a predetermined area, and each of them photographs (or films) surroundings of the place where that camera is disposed. In this way, it is possible to photograph (or film) a person(s) present at or near the place where the camera is disposed. Note that the place where the camera is disposed is arbitrarily determined. For example, the place where the camera is disposed may be in an airport, a theme park, a shopping center, a stadium, or the like.

As shown in FIG. 2, the monitoring apparatus 10 includes a video acquisition unit 100, a video analysis unit 101, an integrated-information sample creation unit 102, a base-information integration unit 103, a specific behavior sample creation unit 104, a specific behavior determination unit 105, a determination result output unit 106, a base-information storage unit 107, an integrated-information sample storage unit 108, an integrated information storage unit 109, and a specific behavior sample storage unit 110.

The video acquisition unit 100 acquires video data generated by photographing (or filming) by the camera. In this example embodiment, video data is acquired from each of N cameras (N is an integer no smaller than one). Note that in this example embodiment, the video acquisition unit 100 acquires video data transmitted from the cameras. However, the monitoring apparatus 10 may read and acquire video data stored in a storage device of the monitoring apparatus 10. As described above, the only requirement for the video acquisition unit 100 is that it should be able to acquire video data. That is, its method for acquiring video data is arbitrarily determined.

The video analysis unit 101 corresponds to the base-information acquisition unit 2 shown in FIG. 1. The video analysis unit 101 analyzes the video data acquired by the video acquisition unit 100 and thereby acquires base information therefrom. For example, the video analysis unit 101 acquires base information from video data of each of a plurality of cameras that photograph different places. In this example embodiment, the video analysis unit 101 acquires moving-path data, human-flow data, and information about the face of a person (hereinafter referred to as facial data) as base information through image analysis processing. Note that a known technique for image analysis processing can be used for the acquisitions of these pieces of base information.

The video analysis unit 101 stores the acquired base information in the base-information storage unit 107. The base-information storage unit 107 is a storage area for storing base information. FIG. 3 is a schematic diagram showing an example of a table of moving-path data stored in the base-information storage unit 107. More specifically, FIG. 3 shows moving-path data acquired from video data of an i-th camera (i is an integer no smaller than 1 and no larger than N) among the N cameras. As shown in FIG. 3, the moving-path data acquired by the video analysis unit 101 is data including, for each moving-path data, an ID for identifying that moving-path data and information about the position of a person at each time point. In FIG. 3, $A_{i\_1}$, $A_{i\_2}$ and the like indicate IDs, and $t_1$, $t_2$ and the like indicate times. Further, $(x_{11}, y_{11})$, $(x_{12}, y_{12})$ and the like indicate position information (coordinates). Note that the data format shown in FIG. 3 is merely an example. That is, data in other data formats may be acquired as the moving-path data.

In order to generate the moving-path data, it is necessary to acquire position information of one and the same person at each time point from video data. When a number of people gather, it may be difficult to acquire position information of each person at each time point from video data. In such a case, information about positions of moving persons can be acquired as human-flow data. Note that the human-flow data is data indicating a flow of people formed by movements of a plurality of persons. More specifically, the human-flow data can also be regarded as data indicating a flow of continuous movements of at least a predetermined number of persons in substantially the same direction.

FIG. 4 is a schematic diagram showing an example of a table of human-flow data stored in the base-information storage unit 107. More specifically, FIG. 4 shows human-flow data acquired from video data of an i-th camera (i is an integer no smaller than 1 and no larger than N) among the N cameras. As shown in FIG. 4, the human-flow data acquired by the video analysis unit 101 is data including, for each human-flow data, an ID for identifying that human-flow data, an area of the flow of people, a time period in which the flow is formed, and a velocity of the flow of people. The area of the flow of people is an area where the flow of people is formed, and can also be regarded as position information indicating a path through which the flow of people passes. The area of the flow of people is, for example, position information indicating a belt-like geographical range. Further, the time period in which the flow is formed is information indicating from when the flow of people is formed to when the flow ceases. The velocity is information indicating a speed and a direction of the movement of the flow of people. In FIG. 4, $B_{i\_1}$, $B_{i\_2}$ and the like indicate IDs, and $a_1$, $a_2$ and the like indicate areas of flows of people. Further, $T_1$, $T_2$ and the like indicate time periods in which the flows are formed, and $v_1$, $v_2$ and the like indicate velocities of the flows. Note that the data format shown in FIG. 4 is merely an example. That is, data in other data formats may be acquired as the human-flow data.

FIG. 5 is a schematic diagram showing an example of a table of facial data stored in the base-information storage unit 107. More specifically, FIG. 5 shows facial data acquired from video data of an i-th camera (i is an integer no smaller than 1 and no larger than N) among the N cameras. As shown in FIG. 5, the facial data acquired by the video analysis unit 101 is data including, for each facial data, an ID for identifying that facial data, detection position information of the face, an image feature value representing the detected face, and a detection time. In FIG. 5, $C_{i\_1}$, $C_{i\_2}$ and the like indicate IDs, and $(x_{11}, y_{11})$, $(x_{21}, y_{21})$ and the like indicate detection position information (coordinates). Further, $f_1$, $f_2$ and the like indicate image feature values, and $t_1$, $t_2$ and the like indicate detection times. Note that the detection position information is, for example, information indicating a position of an area (e.g., an area specified by a rectangle) in an image within which the face is shown. Note that the data format shown in FIG. 5 is merely an example. That is, data in other data formats may be acquired as the facial data. For example, the facial data may contain an image of the face instead of or in addition to the image feature value.

The integrated-information sample creation unit 102 creates, as a sample, integrated information that is data obtained by integrating a plurality of pieces of base information about one and the same person. Note that this sample may be data obtained by integrating a plurality of the same type of pieces of base information, or may be data obtained by integrating different types of pieces of base information. The sample generated by the integrated-information sample creation unit 102 is also referred to as reference information. The reference information is information which the base-information integration unit 103 refers to in order to generate integrated information.

For example, the integrated-information sample creation unit 102 creates a sample of integrated information by associating a plurality of pieces of base information that are designated as pieces of base information about one and the same person by a user. In this case, for example, the user visually checks an image taken by each of the cameras and provides, to the integrated-information sample creation unit 102, an input for instructing it to associate pieces of base information stored in the base-information storage unit 107 with each other. In this way, the integrated-information sample creation unit 102 creates integrated information composed of a plurality of pieces of base information about one and the same person.

Alternatively, the integrated-information sample creation unit 102 may automatically generate a sample of integrated information based on a predetermined behavioral pattern of a person. Note that in this case, the integrated-information sample creation unit 102 is also regarded as a reference information generation unit. For example, it is conceivable that each of the cameras is disposed in a predetermined area (e.g., a theme park) and there is knowledge about how people move in that area. That is, there are cases in which, for example, it is possible to specify an example of a behavioral pattern of a person within the area in advance based on information about passages in the area, information about routes therein, and the like. In such cases, the integrated-information sample creation unit 102 generates, from information indicating the predetermined behavioral pattern, a plurality of pieces of dummy base information that are obtained based on an assumption that a person moves according to this predetermined behavioral pattern, and generates dummy data for integrated information by associating the generated pieces of dummy base information with each other. Note that, specifically, the dummy base information generated based on the predetermined behavioral pattern is moving-path data or human-flow data. Note that the sample integrated information may be further integrated with predetermined facial data. As described above, the reference information may be formed as information including a plurality of pieces of base information that are integrated as information for one and the same person based on the predetermined behavioral pattern of a person.

The integrated-information sample creation unit 102 stores the created integrated information into the integrated-information sample storing unit 108. The integrated-information sample storage unit 108 is a storage area for storing the integrated-information sample created by the integrated-information sample creation unit 102. FIG. 6 is a schematic diagram showing an example of a table of integrated information stored in the integrated-information sample storage unit 108. Note that each of the integrated information storage unit 109 and the specific behavior sample storage unit 110 (which will be described later) also stores integrated information having a similar data structure. As shown in FIG. 6, the integrated information is data including, for each piece of integrated information, an ID for identifying each of that integrated information and information indicating a combination of pieces of base information (i.e., a corresponding relation among a plurality of pieces of base information). In FIG. 6, $X_1$, $X_2$, $X_3$ and the like indicate IDs, and $(A_{1\_1}, B_{3\_2}, C_{3\_1})$, $(A_{2\_1}, B_{1\_3})$ and the like indicate combinations of associated pieces of base information. Note that in the example shown in FIG. 6, the combinations of pieces of base information are expressed by combinations of the IDs of the pieces of base information.

As shown in FIG. 6, each piece of integrated information is composed of an arbitrary combination of pieces of base information. That is, as shown by a piece of integrated information having an ID of $X_1$ in FIG. 6, the integrated information may include all types of pieces of base information that can be acquired by the image analysis unit 101. Further, as shown in pieces of integrated information having IDs of $X_2$, $X_3$ and $X_4$, the integrated information may include some of all the types of pieces of base information that can be obtained by the video analysis unit 101. Further, as shown by a piece of integrated information having an ID of $X_5$, the integrated information may include the same type of pieces of base information.

The base-information integration unit 103 corresponds to the base-information integration unit 3 in FIG. 1, and integrates a plurality of pieces of base information about one and the same person and thereby generates integrated information. The base-information integration unit 103 may integrate different types of pieces of base information about one and the same person or integrate the same type of pieces of base information about one and the same person. The base-information integration unit 103 may integrate pieces of base information acquired from video data of one and the same camera, or integrate pieces of base information acquired from video data of different cameras. The base-information integration unit 103 automatically integrates pieces of base information stored in the base-information storage unit 107, and stores the generated integrated information into the integrated information storage unit 109. Note that the integrated information storage unit 109 is a storage area for storing the integrated information generated by the base-information integration unit 103.

In this example embodiment, for example, the base-information integration unit 103 integrates pieces of base information about one and the same person stored in the base-information storage unit 107 as follows.

For example, the base-information integration unit 103 integrates human-flow data and moving-path data based on the position of a flow of people indicated by the human-flow data and the position of a movement indicated by the moving-path data. In this example embodiment, the above-described position of the flow of people is specified by information about the area of the flow of people $(a_1, a_2, \text{etc.})$ in the human-flow data shown in FIG. 4. Further, the above-described position of the movement is specified by information about the position $((x_{11}, y_{11}), (x_{12}, y_{12}), \text{etc.})$ in the moving-path data shown in FIG. 3.

Figure 7:
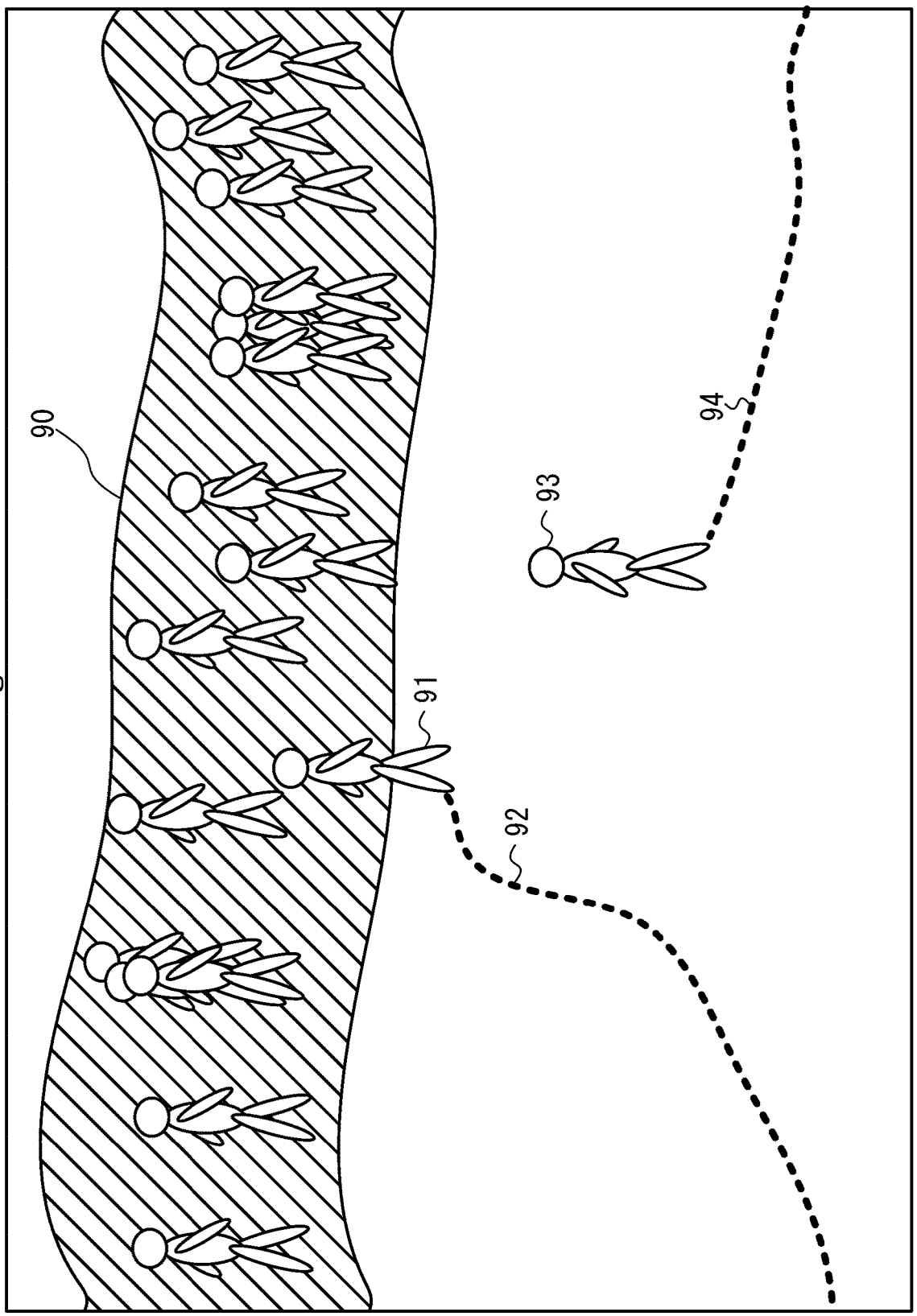
FIG. 7 is a schematic representation of an image taken by a camera.

The above-described integration method performed by the base-information integration unit 103 will be described in a more detailed manner with reference to FIG. 7. FIG. 7 is a schematic representation of an image taken by a camera. In the example shown in FIG. 7, a flow of people 90 is indicated by a hatched area. Further, a moving path 92 of a person 91 and a moving path 94 of a person 93 are indicated by broken lines. Note that it is assumed that people are moving from left to right in the flow of people 90. Further, as shown in FIG. 7, there is a possibility that the place where the flow of people is formed is crowded a plurality of persons. In such a case, base information about a moving path of each person may not be acquired.

As shown in FIG. 7, the end of the moving path 92 of the person 91 is close to the position of the flow of people 90. In such a case, it is inferred that after that, the person 91 moves as a part of the flow of people 90. That is, the base information about the moving path 92 and the base information about the flow of people 90 can be integrated with each other as base information about one and the same person. Similarly, for example, when the start of a moving path of a person is close to a flow of people, it can be inferred that that person has moved out from the flow of people. As described above, for example, when the position of a flow of people indicated by human-flow data and a position of a movement indicated by moving-path data are close to each other, i.e., when a difference between the positions of them is equal to or smaller than a predetermined distance, the base-information integration unit 103 integrates these pieces of base information with each other.

Further, the base-information integration unit 103 may also integrate moving-path data and facial data based on the position indicated by the moving-path data and the position at which the face was recognized. For example, it is assumed that the moving-path data indicates that a given person has passed a point P at a given time. In this case, it can be inferred that facial data about a face photographed (or filmed) near the point P at that time is facial data for the same person as the person for whom the aforementioned moving-path data is created. That is, when the difference between the position indicated by the moving-path data and the position at which the face was recognized is equal to or smaller than a predetermined distance, the base-information integration unit 103 may integrate the moving-path data with the facial data. Note that the human-flow data and the facial data may be integrated with each other based on the position indicated by the human-flow data and the position at which the face was recognized. As described above, the base-information integration unit 103 may integrate a piece of base information about the position of a moving person and a piece of base information about an external feature of a person based on the position indicated by the piece of base information about the position of the moving person and the position at which the external feature of the person was acquired.

Note that when a face is recognized in an area where a flow of people indicated by human-flow data that is to be integrated with moving-path data is formed, the base-information integration unit 103 may integrate the facial data for this face with the moving-path data. Since a flow of people may correspond to any of various movements of people, there are cases in which there are a plurality of moving-path data that could be integrated with human-flow data. For example, it is assumed that a recognition time and a recognition position of a face for given facial data (hereinafter referred to as facial data C) correspond to given human-flow data (hereinafter referred to as human-flow data B). Further, it is assumed that the human-flow data B can be integrated with three moving-path data (hereinafter referred to as moving-path data A1, A2 and A3). In this case, the base-information integration unit 103 selects one of the moving-path data A1, A2 and A3 that is integrated with the facial data C as follows. The base-information integration unit 103 infers, based on times and positions at which persons corresponding to the moving-path data A1, A2 and A3, respectively, joined in the flow of people, the velocity of the flow of people, and the recognition time and the recognition place for the face in the flow of people, a person whose face could be recognized at the recognition time at the recognition position. Then, the base-information integration unit 103 integrates the facial data with the moving-path data corresponding to the inferred person.

Further, the base information integrating unit 103 may integrate pieces of base information with each other by using integrated information (i.e., reference information) stored in the integrated-information sample storing unit 108. As described above, samples of integrated information created by the integrated-information sample creation unit 102 are stored in the integrated-information sample storage unit 108. That is, the integrated information stored in the integrated-information sample storage unit 108 is integrated information for which an integrating relation(s) is set in advance. That is, the integrated information stored in the integrated-information sample storage unit 108 is composed of a plurality of pieces of base information that are integrated with each other in advance as information about one and the same person. For example, the base-information integration unit 103 integrates pieces of base information with each other by using integrated information for which an integrating relation is set in advance as follows. Note that for the sake of explanation, it is assumed that given integrated information stored in the integrated-information sample storage unit 108 indicates integration of a base information piece $p_1$ and a base information piece $p_2$. That is, the base information pieces $p_1$ and $p_2$ are pieces of base information that are integrated in integrated information for which an integrating relation is set in advance. In other words, the base information pieces $p_1$ and $p_2$ are pieces of base information that are integrated in advance as information about one and the same person. In this case, the base-information integration unit 103 integrates, for example, a base information piece $q_1$ similar to the base information piece $p_1$ with a base information piece $q_2$ similar to the base information piece $p_2$. Note that in the above-described integration, each of the base information pieces $p_1$, $q_1$, $p_2$ and $q_2$ is, for example, moving-path data. Alternatively, each of the base information pieces $p_1$, $q_1$, $p_2$ and $q_2$ is, for example, human-flow data. Alternatively, for example, each of the base information pieces $p_1$ and $q_1$ is moving-path data, and each of the base information pieces $p_2$ and $q_2$ is human-flow data.

Note that, specifically, when the difference between features (e.g., positions or shapes) represented by two pieces of base information is equal to or smaller than a predetermined criterion, the base-information integration unit 103 determines that these two pieces of base information are similar to each other. That is, when the difference between the feature represented by the base information piece $p_1$ and that represented by the base information $q_1$ is equal to or smaller than a first predetermined criterion, it is determined that these two pieces of base information are similar to each other. Similarly, when the difference between the feature represented by the base information piece $p_2$ and that represented by the base information $q_2$ is equal to or smaller than a second predetermined criterion, it is determined that these two pieces of base information are similar to each other. Note that the first and second predetermined criteria may be equal to each other or different from each other. That is, the base information pieces $q_1$ and $q_2$ are integrated with each other based on the reference information including the base information piece $p_1$ representing a feature whose difference from the feature represented by the base information piece $q_1$ is equal to or smaller than a predetermined criterion and the base information piece $p_2$ representing a feature whose difference from the feature represented by the base information piece $q_2$ is equal to or smaller than a predetermined criterion. Specifically, the base-information integration unit 103 determines similarity between the base information pieces $p_1$ and $q_1$, and similarity between the base information pieces $p_2$ and $q_2$ based on, for example, similarity between positions that are specified from pieces of base information. In addition to the similarity between the positions specified from pieces of base information, the base-information integration unit 103 may determine similarity between flow lines that are specified from pieces of base information. Specifically, the base-information integration unit 103 determines similarity between moving-path data based on, for example, whether or not the positions where the moving paths are present are similar, and whether or not the shapes represented by the moving paths (i.e., the flow lines) are similar. Further, the base-information integration unit 103 determines similarity between human-flow data based on, for example, whether or not the positions where the flows of people are present are similar, and whether or not the shapes represented by the flows of people (i.e., the flow lines) are similar.

Further, the base-information integration unit 103 may integrate pieces of base information by using, for example, integrated information for which an integrating relation is set in advance as follows. Note that for the sake of explanation, it is assumed that moving-path data $p_3$ acquired from video data of a first camera and moving-path data $p_4$ acquired from video data of a second camera are integrated in advance in integrated information for which an integrating relation is set in advance. Note that the first and second cameras are installed at places distant from each other. Further, it is assumed that a moving time from the place where the first camera is installed to the place where the second camera is installed calculated based on the moving-path data $p_3$ and $p_4$ is a time $t_p$. Further, it is assumed that a moving time from the place where the first camera is installed to the place where the second camera is installed calculated from the moving-path data $q_3$ acquired from video data of the first camera and the moving-path data $q_4$ acquired from video data of the second camera is a time $t_q$. In this case, the base-information integration unit 103 integrates the moving-path data $q_3$ and $q_4$ with each other when the difference between the moving times $t_q$ and $t_p$ is within a predetermined range. Note that in order to improve the reliability of integration, the base-information integration unit 103 may perform the above-described integration only when there are sufficient number of samples each of which indicates that the person has moved from the place where the first camera is installed to the place where the second camera is installed in a moving time of which the difference from the moving time $t_p$ is within a predetermined range. That is, the moving-path data $q_3$ and $q_4$ may be integrated with each other only when at least predetermined number of pieces of integrated information each of which includes a set of moving-path data of which the difference from the moving time $t_p$ from the place where the first camera is installed to the place where the second camera is within a predetermined range are stored in the integrated-information sample storage unit 108.

Note that when the integration of pieces of base information is performed by using integrated information stored in the integrated-information sample storage unit 108 (i.e., integrated information for which an integrating relation is set in advance), the base-information integration unit 103 may use any of the stored integrated information. That is, integrated information that is created by associating pieces of base information designated by a user may be used, or integrated information that is a sample automatically created based on a predetermined behavioral pattern of a person may be used.

As described above, the base-information integration unit 103 may integrate the same type of pieces of base information about one and the same person. For example, the base-information integration unit 103 may integrate a plurality of facial data when their image feature values are similar to each other. Note that the base-information integration unit 103 may integrate moving-path data with each other or integrate human-flow data with each other as well as integrating facial data with each other. For example, the base-information integration unit 103 may integrate a plurality of moving-path data with each other when the ends and the starts of the positions of movements indicated by these moving-path data are close to each other. Further, for example, the base-information integration unit 103 may integrate a plurality of human-flow data when the ends and the starts of the flows of people indicated by these human-flow data are close to each other.

Although the integration method performed by the base-information integration unit 103 has been described above, the integration method is not limited to the above-described method. That is, the integration may be performed by using other methods. Further, when the base-information integration unit 103 performs integration, it may determine whether or not the integration is possible by using a predetermined index value indicating a probability that a plurality of candidate pieces of base information to be integrated are pieces of base information about one and the same person. This index value may be any value indicating a probability that pieces of base information are those about one and the same person. For example, a degree of similarity between pieces of base information may be used, or a degree of closeness between positions indicated in pieces of base information may be used.

Next, a configuration of the monitoring apparatus 10 will be described by referring to FIG. 2 again.

The specific behavior sample creation unit 104 creates a sample of integrated information in a manner similar to that performed by the integrated-information sample creation unit 102. However, the specific behavior sample creation unit 104 creates a sample of integrated information that will be used as a criterion for a determination made by the specific behavior determination unit 105. In other words, the specific behavior sample creation unit 104 creates, as a sample, integrated information that is data obtained by integrating a plurality of pieces of base information about a person who exhibits specific behavior. Note that the specific behavior is, for example, a behavioral pattern that is expected to be exhibited by a suspicious person. However, the specific behavioral pattern is not limited to this example and may be any arbitrary behavioral pattern. Note that the sample created by the specific behavior sample creation unit 104 may be data obtained by integrating a plurality of the same type of pieces of base information, or may be data obtained by integrating different types of pieces of base information as in the case of the sample crated by the integrated-information sample creation unit 102.

The specific behavior sample creation unit 104 automatically creates a sample of integrated information based on, for example, a predetermined specific behavioral pattern. For example, as an input, information representing a behavioral pattern that is expected to be exhibited by a suspicious person is supplied to the specific behavior sample creation unit 104. Then, from the supplied information, the specific behavior sample creation unit 104 generates a plurality of pieces of dummy base information that may be obtained when a person moves in the specific behavioral pattern, and generates dummy data of integrated information by associating the generated pieces of dummy base information with each other. Note that, specifically, the dummy base information generated based on the predetermined behavioral pattern is moving path data or human-flow data. Note that the sample integrated information may be further integrated with predetermined facial data.

Note that similarly to the integrated-information sample creation unit 102, the specific behavior sample creation unit 104 may create a sample of integrated information by associating a plurality of pieces of base information that are designated, by a user, as pieces of base information about one and the same person who exhibits specific behavior.

The specific behavior sample creation unit 104 stores the created integrated information into the specific behavior sample storage unit 110. The specific behavior sample storage unit 110 is a storage area for storing the integrated-information sample created by the specific behavior sample creation unit 104.

The specific behavior determination unit 105 compares integrated information for which an integrating relation corresponding to the specific behavioral pattern is set in advance with integrated information generated by the base-information integration unit 103. That is, the specific behavior determination unit 105 compares the integrated information created by the specific behavior sample creation unit 104 with the integrated information created by the base information integrating unit 103. Then, the specific behavior determination unit 105 determines whether or not the integrated information generated by the base-information integration unit 103 is integrated information corresponding to the specific behavioral pattern based on the result of the comparison. For example, when the integrated information generated by the base-information integration unit 103 is similar to the integrated information generated by the specific behavior sample creation unit 104, the specific behavior determination unit 105 determines that the integrated information generated by the base-information integration unit 103 corresponds to the specific behavioral pattern. Note that the above-described determination can be made by using a model trained through machine learning or the like. In this way, the specific behavior determination unit 105 can determine whether or not the base information acquired from video data from a camera is related to specific behavior such as suspicious behavior. That is, it is possible to detect, for example, an occurrence of suspicious behavior according to the determination made by the specific behavior determination unit 105.

The determination result output unit 106 outputs the result of the determination made by the specific behavior determination unit 105. As the output, the determination result output unit 106 may display the result on a display or transmit the result to other apparatuses. Note that as the determination result, the determination result output unit 106 may output, for example, integrated information that has been determined to correspond to the specific behavioral pattern, or output base information (e.g., facial data) contained in the integrated information.

Next, an example of operations performed by the monitoring apparatus 10 will be described. As the operation of the monitoring apparatus 10, operations that are performed in the stage in which a sample of integrated information is created and those that are performed in the stage in which a monitoring process is performed will be described.

Figure 8:
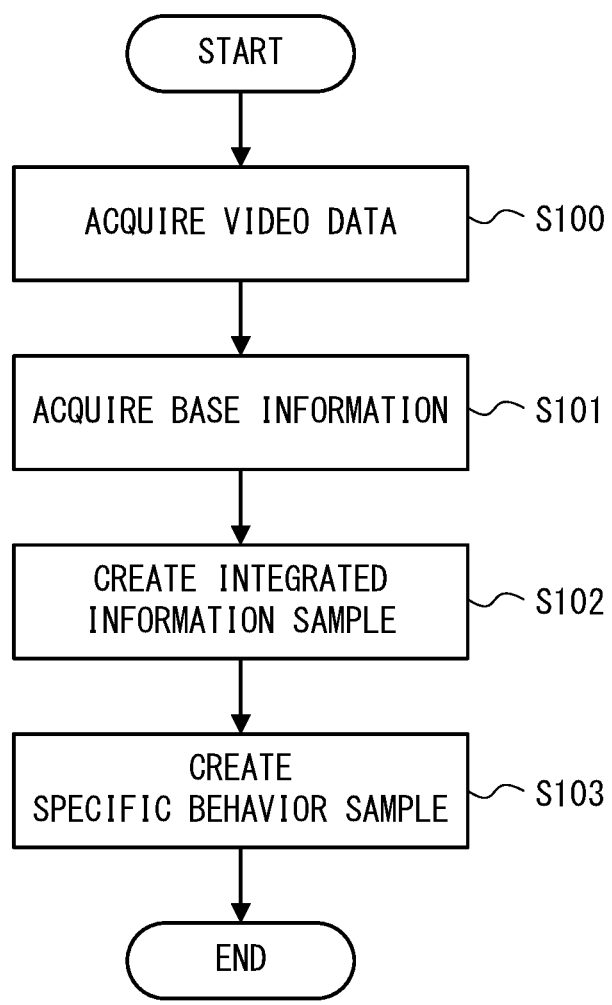
FIG. 8 is a flow chart showing an example of operations performed by a monitoring apparatus in a phase in which a sample of integrated information is created.

FIG. 8 is a flowchart showing an example of operations performed by the monitoring apparatus 10 in the stage in which a sample of integrated information is created. An example of operations performed by the monitoring apparatus 10 in the stage in which a sample of integrated information is created will be described hereinafter with reference to FIG. 8.

In a step 100 (S100), the video acquisition unit 100 acquires video data generated by photographing (i.e., filming) by a camera.

Next, in a step 101 (S101), the video analysis unit 101 analyzes the video data acquired in the step 100 and thereby acquires base information therefrom.

Next, in a step 102 (S102), the integrated-information sample creation unit 102 creates, as a sample, integrated information that is data obtained by integrating a plurality of pieces of base information about one and the same person. For example, according to an instruction from a user, the integrated-information sample creation unit 102 associates the pieces of base information acquired in the step 101 with each other and thereby creates integrated information composed of a plurality of pieces of base information about one and the same person. Note that in the case where the integrated-information sample creation unit 102 automatically creates a sample of integrated information based on a predetermined behavioral pattern of a person in the step 102, the base information acquired in the step 101 is not indispensable. Therefore, in such a case, the steps 100 and 101 may be omitted.

Next, in a step 103 (S103), the specific behavior sample creation unit 104 creates, as a sample, integrated information that is data obtained by integrating a plurality of pieces of base information about a person who exhibits specific behavior. For example, as described above, the specific behavior sample creation unit 104 automatically creates a sample of integrated information based on a predetermined specific behavioral pattern.

Through the above-described operations, a sample of integrated information that will be used in the process for integrating pieces of base information performed by the base-information integration unit 103 is stored in the integrated-information sample storage unit 108. Further, a sample of integrated information that will be used in the determination process performed by the specific behavior determination unit 105 is stored in the specific behavior sample storage unit 110. Note that, needless to say, although the step 103 is performed after the step 102 in the flowchart shown in FIG. 8, these steps may be performed in the reversed order or performed in parallel.

Figure 9:
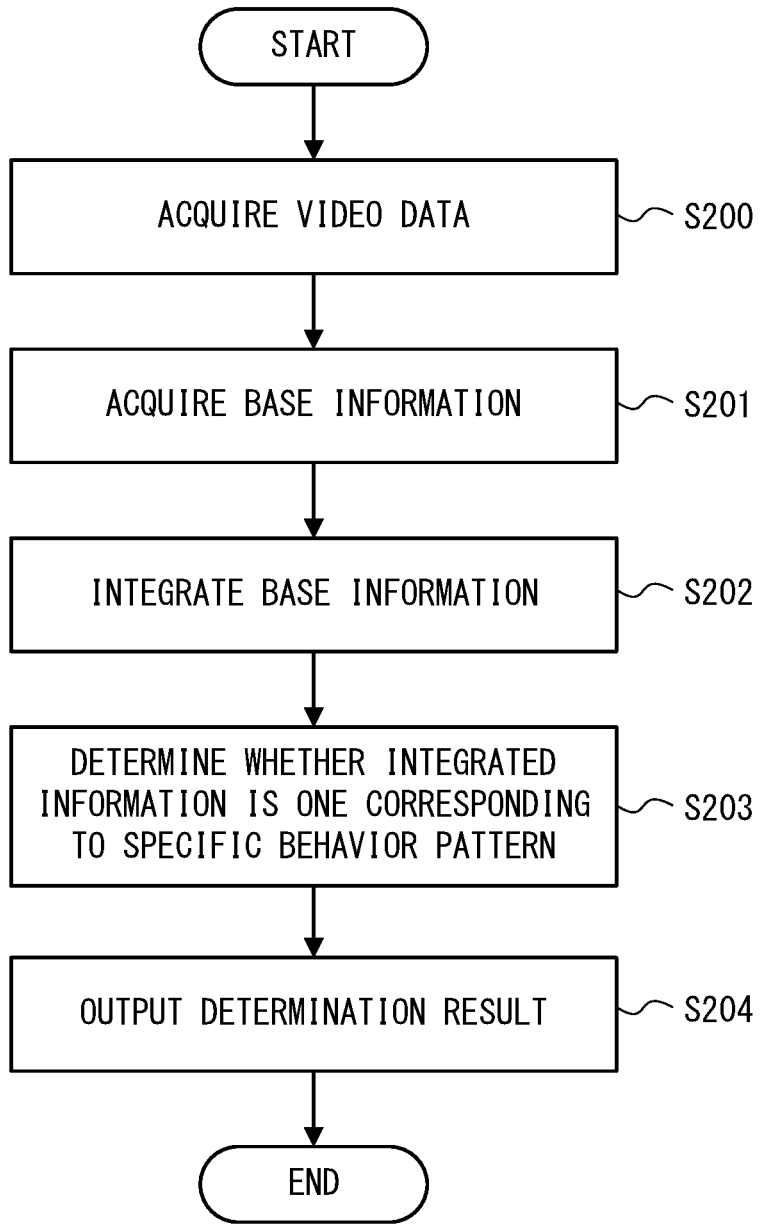
FIG. 9 is a flowchart showing an example of operations performed by the monitoring apparatus in a phase in which a monitoring process is performed.

FIG. 9 is a flowchart showing an example of operations performed by the monitoring apparatus 10 in the stage in which a monitoring process is performed. An example of operations performed by the monitoring apparatus 10 in the stage in which a monitoring process is performed will be described hereinafter with reference to FIG. 9.

In a step 200 (S200), the video acquisition unit 100 acquires video data generated by photographing (i.e., filming) by a camera. Note that the video data acquired in the step 200 is video data of a person to be monitored.

Next, in a step 201 (S201), the video analysis unit 101 analyzes the video data acquired in the step 200 and thereby acquires base information therefrom.

Next, in a step 202 (S202), the base-information integration unit 103 integrates pieces of base information acquired in the step 201 with each other by using, for example, the integration method described above. In this way, a plurality of pieces of base information about one and the same person shown in the video data acquired in the step 200 are associated with each other.

Next, in a step 203 (S203), the specific behavior determination unit 105 determines whether or not the integrated information obtained in the step 202 is integrated information corresponding to a specific behavioral pattern. That is, in the step 203, it is determined whether or not image information of a person corresponding to the specific behavioral pattern is contained in the video data acquired in the step 200.

Next, in a step 204 (S204), the determination result output unit 106 outputs the result of the determination made in the step 203.

Figure 10:
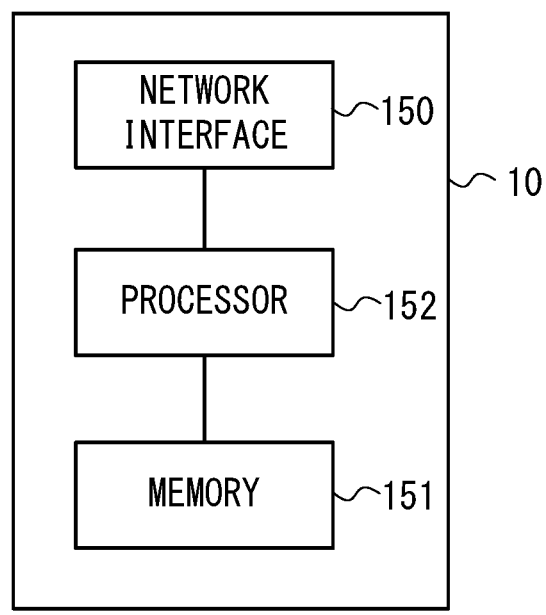
FIG. 10 is a block diagram showing an example of a hardware configuration of a monitoring apparatus according to an example embodiment.

Next, an example of a hardware configuration of the monitoring apparatus 10 will be described. FIG. 10 is a block diagram showing an example of the hardware configuration of the monitoring apparatus 10. As shown in FIG. 10, the monitoring apparatus 10 includes, for example, a network interface 150, a memory 151, and a processor 152.

The network interface 150 is used to communicate with other apparatuses such as cameras. The network interface 150 may include, for example, a network interface card (NIC).

The memory 151 is formed by, for example, a combination of a volatile memory and a nonvolatile memory. Note that the monitoring apparatus 10 may include a storage device such as a hard disk drive in addition to the memory 151.

The memory 151 is used to store software (a computer program) including at least one instruction executed by the processor 152.

The program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

The processor 152 loads and executes software (a computer program) from the memory 151, and thereby performs the above-described processes of the monitoring apparatus 10. That is, the process performed by each of the video acquisition unit 100, the video analysis unit 101, the integrated-information sample creation unit 102, the base-information integration unit 103, the specific behavior sample creation unit 104, the specific behavior determination unit 105, and the determination result output unit 106 may be implemented by executing a program. As described above, the monitoring apparatus 10 has functions as a computer. The processor 152 may be, for example, a microprocessor, an MPU (Micro Processor Unit), or a CPU (Central Processing Unit). The processor 152 may include a plurality of processors.

The memory 151 or the storage device may be used as the base-information storage unit 107, the integrated-information sample storage unit 108, the integrated information storage unit 109, and the specific behavior sample storage unit 110.

Further, the monitoring apparatus 10 may further includes an input device such as a mouse, a keyboard, and/or an output device such as a display. Note that the monitoring apparatus 10 may acquire input information for the monitoring apparatus 10 from other apparatuses through a network, or output information from the monitoring apparatus 10 to other apparatuses through a network.

The example embodiments have been described above. In the monitoring apparatus 10, pieces of base information for one and the same person acquired by the video analysis unit 101 are integrated with each other by the base-information integration unit 103 irrespective of whether or not these pieces of information are the same type of pieces of information or different types of pieces of information. Therefore, it is possible to construct more useful information than in the case where pieces of base information are managed without being associated with each other. In particular, the monitoring apparatus 10 can associate moving-path data, human-flow data, and facial data for one and the same person with one another. These data are not necessarily obtained at the same time at all times. That is, for example, even if moving-path data of a given person is obtained from video data of a given camera, his/her facial data cannot be obtained if the person is facing the opposite direction from the camera. Further, for example, when a given person is moving along a flow of people and a camera cannot photograph (or film) the moving path of the person or the face thereof because of other persons present therebetween, moving-path data and facial data of the person cannot be acquired even if human-flow data thereof is obtained. In this example embodiment, these data are integrated with each other by the base-information integration unit 103. Therefore, even in the above-described case, data can be complemented as information of one and the same person.

Further, when there are a plurality of cameras, pieces of base information of one and the same person can be acquired from various video data, and the base-information integration unit 103 can associate these data with each other as base information for one and the same person.

Further, in this example embodiment, pieces of base information are integrated with each other by using integrated information stored in the integrated-information sample storage unit 108. Therefore, it is possible to carry out integration while paying attention to a pre-defined integrating relation(s). Further, a sample that is created based on a predetermined behavioral pattern of a person can be used as integrated information stored in the integrated-information sample storage unit 108. Therefore, it is possible to easily prepare integrated information for which an integrating relation is set in advance.

Further, in this example embodiment, the monitoring apparatus 10 includes the specific behavior determination unit 105. Therefore, it is possible to find a person who performs a specific behavioral pattern.

Note that the present invention is not limited to the above-described example embodiments and can be modified as appropriate without departing from the scope and spirit of the invention.

The whole or part of the example embodiments disclosed above can be described as, but not limited to, the following supplementary notes.

(Supplementary Note 1)

An information processing apparatus comprising:

base-information acquisition means for acquiring a plurality of types of pieces of base information based on video data in which at least one person is shown, the pieces of base information being pieces of information used to monitor a person; and base-information integration means for generating integrated information by integrating, among the plurality of pieces of base information, those that satisfy a predetermined relation as information of one and the same person.

(Supplementary Note 2)

The information processing apparatus described in Supplementary note 1, wherein the base-information acquisition means acquires at least information about a position of a moving person as the piece of base information.

(Supplementary Note 3)

The information processing apparatus described in Supplementary note 2, wherein the information about the position of the moving person includes human-flow data and moving-path data, the human-flow data being data indicating a flow of people formed by movements of a plurality of persons, the moving-path data being data indicating a moving path of one and the same person, and the base-information integration means integrates the human-flow data and the moving-path data based on the position of the flow of people indicated by the human-flow data and the position of the movement indicated by the moving-path data.

(Supplementary Note 4)

The information processing apparatus described in Supplementary note 2 or 3, wherein the base-information acquisition means further acquires information about an external feature of the person as the piece of base information, and the base-information integration means integrates the information about the position of the moving person and the information about the external feature of the person based on the position indicated by the information about the position of the moving person and a position at which the external feature is acquired.

(Supplementary Note 5)

The information processing apparatus described in any one of Supplementary notes 1 to 4, wherein the base-information integration means integrates a first base information piece and a second base information piece among the pieces of base information based on reference information, the reference information being information that is referred to in order to generate the integrated information, and the reference information includes a third base information piece representing a feature of which a difference from a feature represented by the first base information piece is equal to or smaller than a predetermined criterion, and a fourth base information piece representing a feature of which a difference from a feature represented by the second base information piece is equal to or smaller than a predetermined criterion.

(Supplementary Note 6)

The information processing apparatus described in Supplementary note 5, wherein the reference information includes the third and fourth base information pieces, which are integrated with each other as information of one and the same person based on a predetermined behavioral pattern of a person.

(Supplementary Note 7)
The information processing apparatus described in Supplementary note 6, further comprising reference information generation means for generating the reference information based on the predetermined behavioral pattern of the person.

(Supplementary Note 8)
The information processing apparatus described in any one of Supplementary notes 1 to 7, wherein the base-information integration means further integrates the same type of pieces of base information about one and the same person.

(Supplementary Note 9)
The information processing apparatus described in Supplementary note 8, wherein
the base-information acquisition means acquires, as the piece of base information, at least moving-path data, moving-path data being data indicating a moving path of one and the same person,
when a difference between a moving time from a place where a first camera is installed to a place where a second camera is installed calculated based on first moving-path data and second moving-path data and a moving time from the place where the first camera is installed to the place where the second camera is installed calculated based on third moving-path data and fourth moving-path data is within a predetermined range, the base-information integration means integrates the third moving-path data and the fourth moving-path data,
the first and third moving-path data are data that are obtained from video data of the first camera and contain information about a position of a person at each time point,
the second and fourth moving-path data are data that are obtained from video data of the second camera and contain information about a position of a person at each time point, the second camera being installed in a place distant from the first camera, and
the first and second moving-path data are the pieces of base information that are integrated with each other in advance as information about one and the same person.

(Supplementary Note 10)
The information processing apparatus described in Supplementary note 4, wherein the external feature is a feature of a face of a person.

(Supplementary Note 11)
The information processing apparatus described in any one of Supplementary notes 1 to 10, further comprising determination means for comparing integrated information for which an integrating relation corresponding to a specific behavioral pattern is set in advance with the integrated information generated by the base-information integration means, and thereby determining whether or not the integrated information generated by the base-information integration means is the integrated information corresponding to the specific behavioral pattern.

(Supplementary Note 12)
The information processing apparatus described in any one of Supplementary notes 1 to 11, wherein the base-information acquisition means acquires the piece of base information from video data of each of a plurality of cameras configured to photograph different places.

(Supplementary Note 13)
A data generation method comprising:
acquiring a plurality of types of pieces of base information based on video data in which at least one person is shown, the pieces of base information being pieces of information used to monitor a person; and
generating integrated information by integrating, among the plurality of pieces of base information, those that satisfy a predetermined relation as information of one and the same person.

(Supplementary Note 14)
A non-transitory computer readable medium storing a program for causing a computer to perform:
a base-information acquisition step of acquiring a plurality of types of pieces of base information based on video data in which at least one person is shown, the pieces of base information being pieces of information used to monitor a person; and
a base-information integration step of generating integrated information by integrating, among the plurality of pieces of base information, those that satisfy a predetermined relation as information of one and the same person.

Although the present invention is explained above with reference to example embodiments, the present invention is not limited to the above-described example embodiments. Various modifications that can be understood by those skilled in the art can be made to the configuration and details of the present invention within the scope of the invention.

REFERENCE SIGNS LIST

1 INFORMATION PROCESSING APPARATUS
2 BASE-INFORMATION ACQUISITION UNIT
3 BASE-INFORMATION INTEGRATION UNIT
10 MONITORING APPARATUS
100 VIDEO ACQUISITION UNIT
101 IMAGE ANALYSIS UNIT
102 INTEGRATED-INFORMATION SAMPLE CREATION UNIT
103 BASE-INFORMATION INTEGRATION UNIT
104 SPECIFIC BEHAVIOR SAMPLE CREATION UNIT
105 SPECIFIC BEHAVIOR DETERMINATION UNIT
106 DETERMINATION RESULT OUTPUT UNIT
107 BASE-INFORMATION STORAGE UNIT
108 INTEGRATED-INFORMATION SAMPLE STORAGE UNIT
109 INTEGRATED INFORMATION STORAGE UNIT
110 SPECIFIC BEHAVIOR SAMPLE STORAGE UNIT
150 NETWORK INTERFACE
151 MEMORY
152 PROCESSOR

The invention claimed is:
1. An information processing apparatus comprising:
at least one memory storing program instructions; and
at least one processor configured to execute the instructions stored in the memory to:
acquire a plurality of types of pieces of base information based on video data in which at least one person is shown, the pieces of base information being pieces of information used to monitor a person; and
generate integrated information by integrating, among the plurality of pieces of base information, those that satisfy a predetermined relation as information of one and the same person, wherein
the processor is further configured to execute the instructions to integrate a first base information piece and a second base information piece among the pieces of base information based on reference information, the reference information being information that is referred to in order to generate the integrated information, and the reference information includes a third base information piece representing a feature of which a difference from a feature represented by the first base information piece is equal to or smaller than a predetermined criterion, and a fourth base information piece representing a feature of which a difference from a feature represented by the second base information piece is equal to or smaller than a predetermined criterion.

2. The information processing apparatus according to claim 1, wherein the processor is further configured to execute the instructions to acquire at least information about a position of a moving person as the piece of base information.

3. The information processing apparatus according to claim 2, wherein
the information about the position of the moving person includes human-flow data and moving-path data, the human-flow data being data indicating a flow of people formed by movements of a plurality of persons, the moving-path data being data indicating a moving path of one and the same person, and
the processor is further configured to execute the instructions to integrate the human-flow data and the moving-path data based on the position of the flow of people indicated by the human-flow data and the position of the movement indicated by the moving-path data.

4. The information processing apparatus according to claim 2, wherein
the processor is further configured to execute the instructions to:
acquire information about an external feature of the person as the piece of base information, and
integrate the information about the position of the moving person and the information about the external feature of the person based on the position indicated by the information about the position of the moving person and a position at which the external feature is acquired.

5. The information processing apparatus according to claim 1, wherein the reference information includes the third and fourth base information pieces, which are integrated with each other as information of one and the same person based on a predetermined behavioral pattern of a person.

6. The information processing apparatus according to claim 5, wherein the processor is further configured to execute the instructions to generate the reference information based on the predetermined behavioral pattern of the person.

7. The information processing apparatus according to claim 1, wherein the processor is further configured to execute the instructions to integrate the same type of pieces of base information about one and the same person.

8. The information processing apparatus according to claim 7, wherein
the processor is further configured to execute the instructions to:
acquire, as the piece of base information, at least moving-path data, moving-path data being data indicating a moving path of one and the same person,
when a difference between a moving time from a place where a first camera is installed to a place where a second camera is installed calculated based on first moving-path data and second moving-path data and a moving time from the place where the first camera is installed to the place where the second camera is installed calculated based on third moving-path data and fourth moving-path data is within a predetermined range, integrate the third moving-path data and the fourth moving-path data,
the first and third moving-path data are data that are obtained from video data of the first camera and contain information about a position of a person at each time point,
the second and fourth moving-path data are data that are obtained from video data of the second camera and contain information about a position of a person at each time point, the second camera being installed in a place distant from the first camera, and
the first and second moving-path data are the pieces of base information that are integrated with each other in advance as information about one and the same person.

9. The information processing apparatus according to claim 4, wherein the external feature is a feature of a face of a person.

10. The information processing apparatus according to claim 1, the processor is further configured to execute the instructions to compare integrated information for which an integrating relation corresponding to a specific behavioral pattern is set in advance with the generated integrated information, and thereby determine whether or not the generated integrated information is the integrated information corresponding to the specific behavioral pattern.

11. The information processing apparatus according to claim 1, wherein the processor is further configured to execute the instructions to acquire the piece of base information from video data of each of a plurality of cameras configured to photograph different places.

12. A data generation method comprising:
acquiring a plurality of types of pieces of base information based on video data in which at least one person is shown, the pieces of base information being pieces of information used to monitor a person; and
generating integrated information by integrating, among the plurality of pieces of base information, those that satisfy a predetermined relation as information of one and the same person, wherein
in the generation of the integrated information, a first base information piece and a second base information piece among the pieces of base information are integrated based on reference information, the reference information being information that is referred to in order to generate the integrated information, and
the reference information includes a third base information piece representing a feature of which a difference from a feature represented by the first base information piece is equal to or smaller than a predetermined criterion, and a fourth base information piece representing a feature of which a difference from a feature represented by the second base information piece is equal to or smaller than a predetermined criterion.

13. A non-transitory computer readable medium storing a program for causing a computer to perform:
a base-information acquisition step of acquiring a plurality of types of pieces of base information based on video data in which at least one person is shown, the pieces of base information being pieces of information used to monitor a person; and
a base-information integration step of generating integrated information by integrating, among the plurality of pieces of base information, those that satisfy a predetermined relation as information of one and the same person, wherein in the base-information integration step, a first base information piece and a second base information piece among the pieces of base information are integrated based on reference information, the reference information being information that is referred to in order to generate the integrated information, and the reference information includes a third base information piece representing a feature of which a difference from a feature represented by the first base information piece is equal to or smaller than a predetermined criterion, and a fourth base information piece representing a feature of which a difference from a feature represented by the second base information piece is equal to or smaller than a predetermined criterion.

\* \* \* \* \*